United States Patent
Kulkarni et al.

(10) Patent No.: US 11,755,766 B2
(45) Date of Patent: Sep. 12, 2023

(54) SYSTEMS AND METHODS FOR DETECTING PERSONALLY IDENTIFIABLE INFORMATION

(71) Applicant: Tata Consultancy Services Limited, Mumbai (IN)

(72) Inventors: Aniket Dilip Kulkarni, Pune (IN); Nikhil Patwardhan, Pune (IN); Jayant Dani, Mumbai (IN); Ashim Roy, Pune (IN); Anantha Desik, Hyderabad (IN); Spondita Paul, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 497 days.

(21) Appl. No.: 16/948,367

(22) Filed: Sep. 15, 2020

(65) Prior Publication Data

US 2021/0097197 A1    Apr. 1, 2021

(30) Foreign Application Priority Data

Sep. 27, 2019    (IN) .............................. 201921039258

(51) Int. Cl.
*G06F 21/62*    (2013.01)
*G06N 20/00*    (2019.01)
(Continued)

(52) U.S. Cl.
CPC .... *G06F 21/6227* (2013.01); *G06F 16/90344* (2019.01); *G06F 18/214* (2023.01);
(Continued)

(58) Field of Classification Search
CPC .......... G06F 21/6227; G06F 16/90344; G06F 18/214; G06F 18/22; G06F 21/6245; G06F 16/215; G06F 21/6254; G06N 20/00

See application file for complete search history.

(56) References Cited

U.S. PATENT DOCUMENTS

2017/0364931 A1*  12/2017  Khavronin .............. G06F 16/35
2018/0232528 A1    8/2018  Williamson et al.
(Continued)

OTHER PUBLICATIONS

Kowsari, Kamron et al., "Text Classification Algorithms: A Survey", Apr. 23, 2019, Kamran Kowsari, Kiana Jafaro Meimandi, Mojtaba Heidarysafa, Sanjana Mendu, Laura Barnes, and Donald Brown.*

(Continued)

*Primary Examiner* — Shewaye Gelagay
*Assistant Examiner* — Carlton Johnson
(74) *Attorney, Agent, or Firm* — Finnegan, Henderson, Farabow, Garrett & Dunner LLP

(57) ABSTRACT

The disclosure generally relates to systems and methods for detecting personally identifiable information (PII). The present systems and methods solve the problem of detecting the PII and the PII column names in the customer database with enhanced accuracy, by developing a PII classification model trained with an enhanced and effective training dataset. An enhanced sub-metadata from the metadata having the plurality of the column names is obtained by using highest match distance values, the string comparator values, and the is PII indicator values. The enhanced sub-metadata comprising the column names that can be easily differentiated as PII columns or non-PII columns. Hence the training dataset and the testing dataset obtained from the enhanced sub-metadata improves the accuracy of the PII classification model. Preventive measures can be taken to protect such detected PII present under the PII columns by employing various data privacy and protection techniques.

19 Claims, 3 Drawing Sheets

(51) Int. Cl.
*G06F 16/903* (2019.01)
*G06F 18/22* (2023.01)
*G06F 18/214* (2023.01)

(52) U.S. Cl.
CPC .......... *G06F 18/22* (2023.01); *G06F 21/6245* (2013.01); *G06N 20/00* (2019.01)

(56) References Cited

U.S. PATENT DOCUMENTS

| | | |
|---|---|---|
| 2018/0314853 A1 | 11/2018 | Oliner et al. |
| 2019/0034808 A1 | 1/2019 | Palanichamy |
| 2019/0102681 A1* | 4/2019 | Roberts .................... G06N 5/01 |
| 2020/0050966 A1* | 2/2020 | Enuka ..................... G06F 17/18 |
| 2020/0250345 A1* | 8/2020 | Bässler et al. .......... G06F 16/93 |
| 2021/0089505 A1* | 3/2021 | Gordon ............... G06F 21/6245 |

OTHER PUBLICATIONS

Bishop, Griffin et al., "Deep Learning for Data Privacy Classification", Nov. 4, 2018, Bertram Dunskus, Aristo Consulting, https://web.wpi.edu/Pubs/E-project/Available/E-project-110418-210310/unrestricted/deep_learning_for_data_privacy_classification.pdf.

* cited by examiner

SYSTEMS AND METHODS FOR DETECTING PERSONALLY IDENTIFIABLE INFORMATION

PRIORITY CLAIM

This U.S. patent application claims priority under 35 U.S.C. § 119 to: Indian Patent Application No. 201921039258, filed on 27 Sep. 2019. The entire contents of the aforementioned application are incorporated herein by reference.

TECHNICAL FIELD

The disclosure herein generally relates to data privacy and security, and, more particularly, to systems and methods for detecting personally identifiable information enabling better management of data privacy and security of customer data.

BACKGROUND

Organizations maintain customer databases for various purposes including business and sales promotions. The customer databases may include personally identifiable information (PII) of customers such as name of customer, address, mobile number and so on, in various structures and formats. The PII may be helpful in distinguishing one customer from other. So the PII is considered as sensitive information of the customers and need to be protected.

Detecting such PII present in the customer database is a challenging task, as the PII may be present under different terminology, variety and combination of column names, for example in a database table. Some conventional systems utilize heuristic based approaches for detecting the PII, in which text or pattern matching is carried out. Some conventional systems utilize machine learning based models for detecting the PII from the customer databases. However, detecting the PII with significant detection accuracy is a continuous area of an improvement.

SUMMARY

Embodiments of the present disclosure present technological improvements as solutions to one or more of the above-mentioned technical problems recognized by the inventors in conventional systems.

In an aspect, there is provided a processor implemented method comprising the steps of: receiving, via one or more hardware processors, a defined personally identifiable information (PII) dataset, wherein the defined PII dataset comprises a plurality of PII column names; receiving, via the one or more hardware processors, a metadata comprising a plurality of column names from a data source, wherein each column name of the plurality of column names is indicative of one of a PII category and a non-PII category; calculating, via the one or more hardware processors, a highest match distance value for each column name of the plurality of column names present in the metadata, based on the plurality of PII column names present in the defined PII dataset; determining, via the one or more hardware processors, a string comparator value for each column name of the plurality of column names present in the metadata, based on the plurality of PII column names present in the defined PII dataset; evaluating, via the one or more hardware processors, an is PII indicator value for each column name of the plurality of column names present in the metadata, based on the highest match distance value and the string comparator value; obtaining, via the one or more hardware processors, a sub-metadata comprising one or more column names selected from the plurality of column names present in the metadata, based on the highest match distance value and the is PII indicator value (212) dividing, via the one or more hardware processors, the one or more column names of the sub-metadata into a training dataset and a testing dataset, based on a random sampling method; generating, via the one or more hardware processors, a training sparse matrix based on the training dataset and the sub-metadata, and a testing sparse matrix based on the testing dataset and the sub-metadata; obtaining, via the one or more hardware processors, training sparse matrix features and testing sparse matrix features, wherein the training sparse matrix features are indicative of matrix elements present in the training sparse matrix and the testing sparse matrix features are indicative of matrix elements present in the testing sparse matrix; and generating, via the one or more hardware processors, a PII classification model, by training a machine learning model with an input training dataset, wherein the input training dataset comprises the training sparse matrix features, associated highest match distance values, and associated is PII indicator values.

In another aspect, there is provided a system for one or more data storage devices operatively coupled to one or more hardware processors and configured to store instructions which when executed cause the one or more hardware processors to: receive a defined personally identifiable information (PII) dataset, wherein the defined PII dataset comprises a plurality of PII column names; receive a metadata comprising a plurality of column names from a data source, wherein each column name of the plurality of column names is indicative of one of a PII category and a non-PII category; calculate a highest match distance value for each column name of the plurality of column names present in the metadata, based on the plurality of PII column names present in the defined PII dataset; determine a string comparator value for each column name of the plurality of column names present in the metadata, based on the plurality of PII column names present in the defined PII dataset; evaluate an is PII indicator value for each column name of the plurality of column names present in the metadata, based on the highest match distance value and the string comparator value; obtain a sub-metadata comprising one or more column names selected from the plurality of column names present in the metadata, based on the highest match distance value and the is PII indicator value; divide the one or more column names of the sub-metadata into a training dataset and a testing dataset, based on a random sampling method; generate a training sparse matrix based on the training dataset and the sub-metadata, and a testing sparse matrix based on the testing dataset and the sub-metadata; obtain training sparse matrix features and testing sparse matrix features, wherein the training sparse matrix features are indicative of matrix elements present in the training sparse matrix and the testing sparse matrix features are indicative of matrix elements present in the testing sparse matrix; and generate a PII classification model, by training a machine learning model with an input training dataset, wherein the input training dataset comprises the training sparse matrix features, associated highest match distance values, and associated is PII indicator values.

In yet another aspect, there is provided a computer program product comprising a non-transitory computer readable medium having a computer readable program embodied therein, wherein the computer readable program, when executed on a computing device, causes the computing device to: receive a defined personally identifiable information (PII) dataset, wherein the defined PII dataset comprises a plurality of PII column names; receive a metadata comprising a plurality of column names from a data source, wherein each column name of the plurality of column names is indicative of one of a PII category and a non-PII category; calculate a highest match distance value for each column name of the plurality of column names present in the metadata, based on the plurality of PII column names present in the defined PII dataset; determine a string comparator value for each column name of the plurality of column names present in the metadata, based on the plurality of PII column names present in the defined PII dataset; evaluate an is PII indicator value for each column name of the plurality of column names present in the metadata, based on the highest match distance value and the string comparator value; obtain a sub-metadata comprising one or more column names selected from the plurality of column names present in the metadata, based on the highest match distance value and the is PII indicator value; divide the one or more column names of the sub-metadata into a training dataset and a testing dataset, based on a random sampling method; generate a training sparse matrix based on the training dataset and the sub-metadata, and a testing sparse matrix based on the testing dataset and the sub-metadata; obtain training sparse matrix features and testing sparse matrix features, wherein the training sparse matrix features are indicative of matrix elements present in the training sparse matrix and the testing sparse matrix features are indicative of matrix elements present in the testing sparse matrix; and generate a PII classification model, by training a machine learning model with an input training dataset, wherein the input training dataset comprises the training sparse matrix features, associated highest match distance values, and associated is PII indicator values.

In an embodiment of the present disclosure, the one or more hardware processors of the system are further configured by the instructions to: receive an input customer database comprising one or more input column names to be detected as PII column or non-PII column; calculate the highest match distance value for each input column name of the one or more input column names present in the input customer database; generate, via the one or more hardware processors, an input sparse matrix based on the input customer database and the sub-metadata; obtain input sparse matrix features that are indicative of matrix elements present in the input sparse matrix; and detect each input column name of the one or more input column names as the PII column or the non-PII column, using the PII classification model, based on the input sparse matrix features and the associated highest match distance value.

In an embodiment of the present disclosure, the one or more hardware processors of the system are further configured by the instructions to validate the PII classification model, using an input testing dataset comprising testing sparse matrix features, the associated highest match distance values, and the associated is PII indicator values.

It is to be understood that both the foregoing general description and the following detailed description are exemplary and explanatory only and are not restrictive of the embodiments of the present disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Personally identifiable information (PII) of customers may be present in various forms of column names (in a table) in a customer database. Organizations may use their own structure of the customer database for storing the customer information. For example, some organizations may store the customer name under three column names including 'First name', 'Middle name', and 'Last name'. Some organizations may store the customer name under two column names including 'First name' and 'Middle name'. Number of column names may vary from country to country and one customer to another customer, may be because: (i) some may have first name, middle name and last name in their name, some may have only first name and last name and some may have only first name, and so on, and (ii) based on requirement of the organization maintaining the customer database.

So detection of such PII column names in the customer database with enhanced accuracy is a difficult task as the organizations may store such information with different terminology, variety and combination of column names. Embodiments herein provide systems and methods for detecting personally identifiable information, solves the problem of detecting the PII and the PII column names in the customer database with enhanced accuracy, by developing a PII classification model trained with an enhanced and effective training dataset and testing dataset. The training dataset and the testing dataset is obtained by processing a metadata including a plurality of column names. Accurate identification of the PII enables better management of data privacy and security of customer data.

Figure 1:
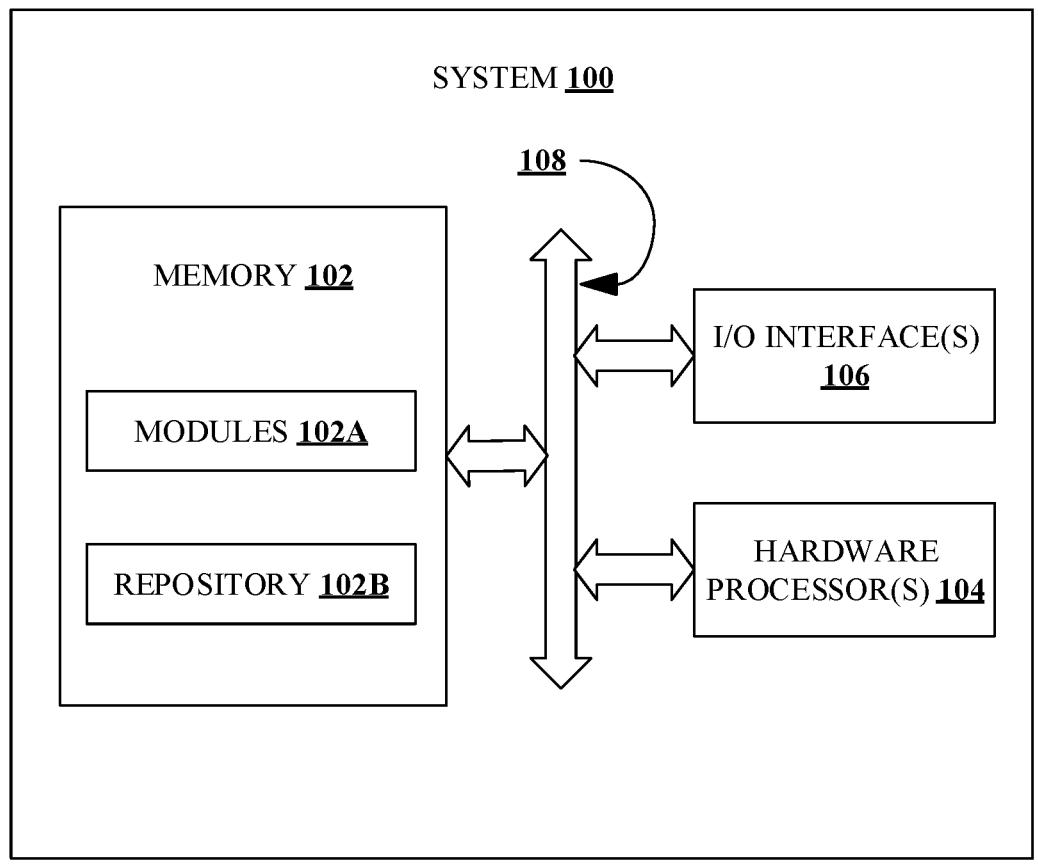
FIG. 1 is an exemplary functional block diagram of a system for detecting personally identifiable information (PII) of customers in customer databases of an organization, according to some embodiments of the present disclosure.
Figure 2A:
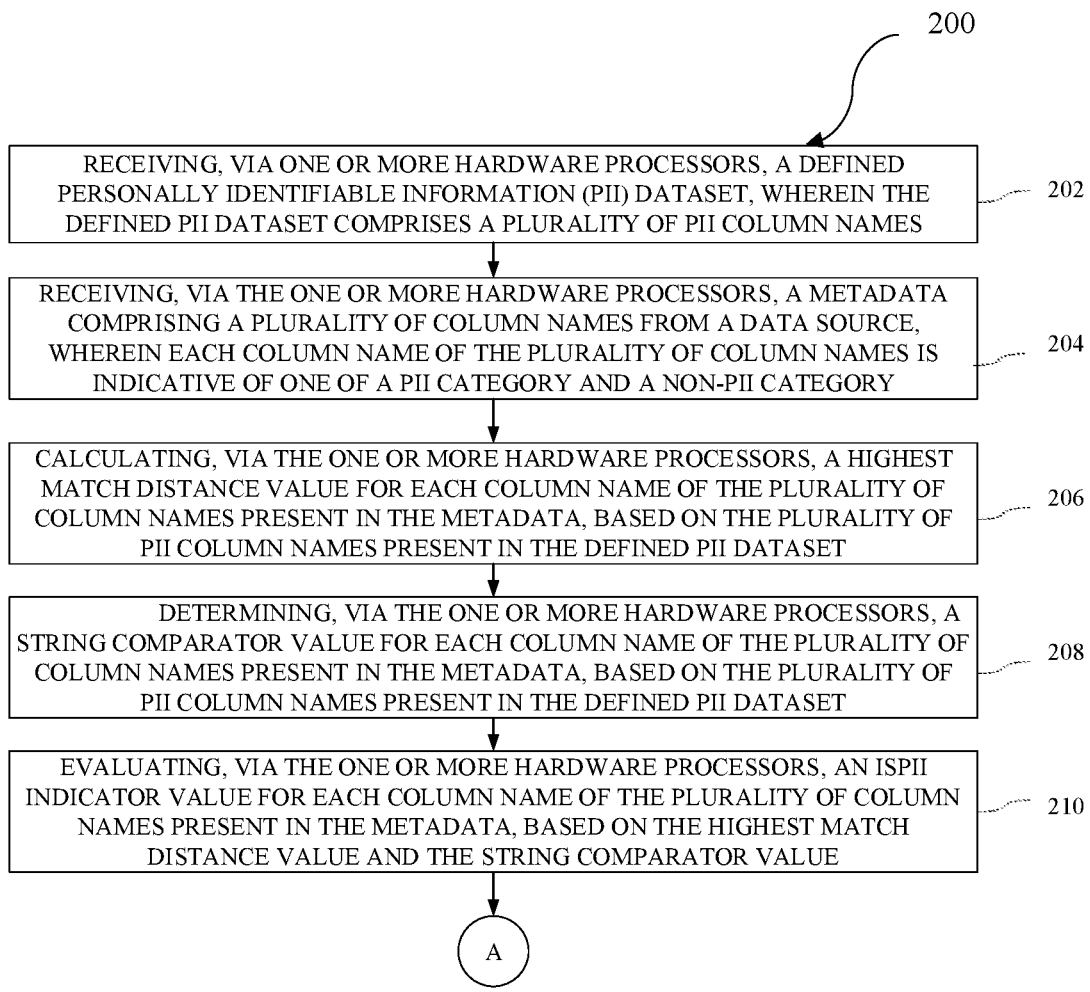
FIG. 2A and FIG. 2B illustrate exemplary flow diagrams of a processor-implemented method for detecting PII of the customers in the customer databases of the organization, according to some embodiments of the present disclosure.
Figure 2B:
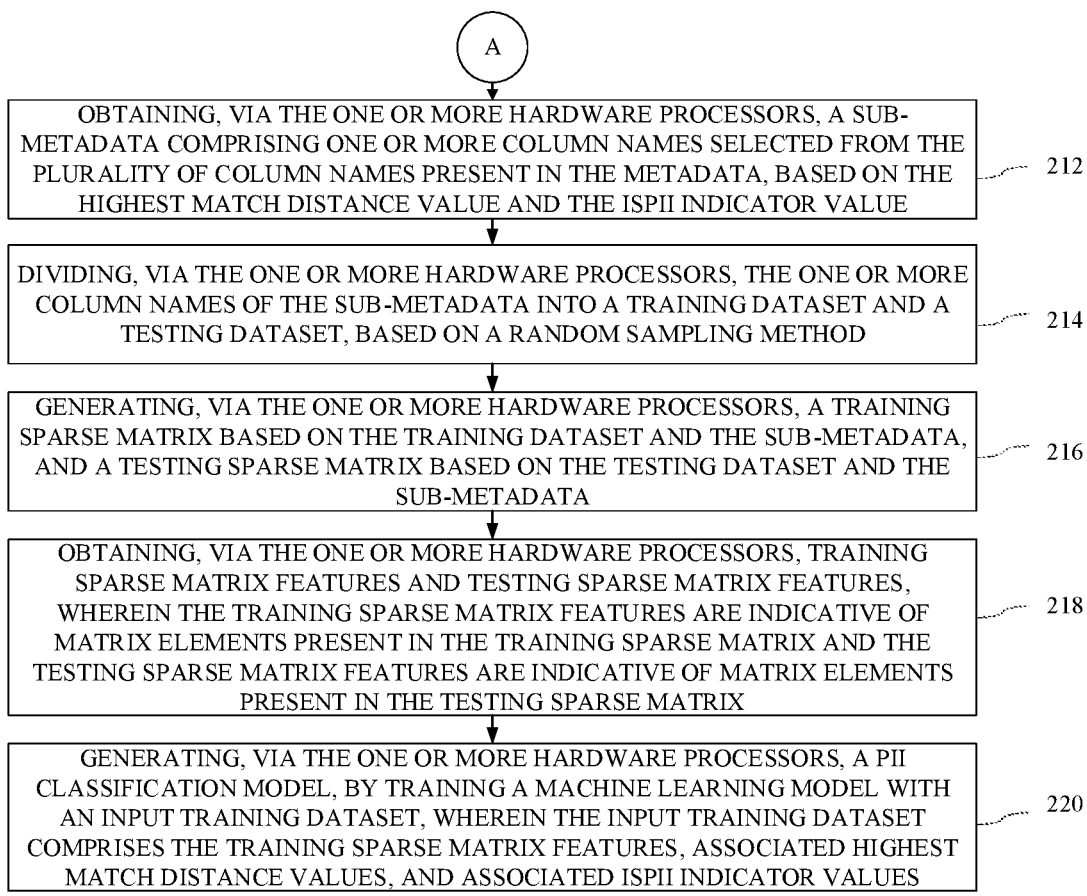

Referring now to the drawings, and more particularly to FIG. 1 through FIG. 2B, where similar reference characters denote corresponding features consistently throughout the figures, there are shown preferred embodiments and these embodiments are described in the context of the following exemplary systems and/or methods.

FIG. 1 is an exemplary functional block diagram of a system 100 for detecting personally identifiable information of the customers in the customer databases of the organization, according to some embodiments of the present disclosure. In the context of the present disclosure, the organization or the organizations refer to private organizations such as offices, companies, educational institutes, shops and shopping malls, e-commerce entities and so on, government organizations that are maintaining information of their citizens, or any third-party organizations such as public private entities. The customers refer to the persons who are taking the services of the organizations, providing services to the organizations or who are subscribed to the organizations. The customer databases are the databased maintained by the organizations, having the information related to their customers.

In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102A and a repository 102B for storing data processed, received, and generated by one or more of the plurality of modules 102A. The plurality of modules 102A may include routines, programs, objects, components, data structures, and so on, which perform particular tasks or implement particular abstract data types.

The plurality of modules 102A may include programs or computer-readable instructions or coded instructions that supplement applications or functions performed by the system 100. The plurality of modules 102A may also be used as, signal processor(s), state machine(s), logic circuitries, and/or any other device or component that manipulates signals based on operational instructions. Further, the plurality of modules 102A can be used by hardware, by computer-readable instructions executed by the one or more hardware processors 104, or by a combination thereof. In an embodiment, the plurality of modules 102A can include various sub-modules (not shown in FIG. 1). Further, the memory 102 may include information pertaining to input(s)/output(s) of each step performed by the processor(s) 104 of the system 100 and methods of the present disclosure.

The repository 102B may include a database or a data engine. Further, the repository 102B amongst other things, may serve as a database or includes a plurality of databases for storing the data that is processed, received, or generated as a result of the execution of the plurality of modules 102A. Although the repository 102B is shown internal to the system 100, it will be noted that, in alternate embodiments, the repository 102B can also be implemented external to the system 100, where the repository 102B may be stored within an external database (not shown in FIG. 1) communicatively coupled to the system 100. The data contained within such external database may be periodically updated. For example, new data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102B may be distributed between the system 100 and the external database. The components and functionalities of the system 100 are described further in detail with reference to FIG. 2.

Referring to FIG. 2A and FIG. 2B, components and functionalities of the system 100 are described in accordance with an example embodiment of the present disclosure. FIG. 2A and FIG. 2B illustrate exemplary flow diagrams of a processor-implemented method 200 for detecting personally identifiable information of the customers in the customer databases of the organization, according to some embodiments of the present disclosure. Although steps of the method 200 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 202 of the method 200, the one or more hardware processors 104 of the system 100 are configured to receive a defined PII dataset including a plurality of PII column names. The information present under the PII column names is considered as PII. In an embodiment, the PII column names may be defined by global or national data protection regulation authorities. In an embodiment, the plurality of PII column names defined by General Data Protection Regulation (GDPR) of European Union (EU), are 'First Name', 'Middle Name', 'Last Name', 'Surname', 'Address', 'Street', 'Pin Code', 'Telephone Number', 'ID Card Number', 'Passport Number', 'PAN Number', 'Account Number', 'Email Address', 'Driver License', 'Social Security Number', 'Date of Birth', 'Ethnicity', 'Race', 'Country', 'City', 'Postal', 'State', 'Gender', 'Fax Number', and 'Location'. In an embodiment, the PII column names present in the defined PII dataset may be altered or optimized based on modification or addition to the PII column names by such global or national data protection regulation authorities. In an embodiment, the PII column names present in the defined PII dataset may also be defined by the organizations based on their requirement. In an embodiment, the defined PII dataset may be stored in the repository 102B of the system 100.

At step 204 of the method 200, the one or more hardware processors 104 of the system 100 are configured to receive a metadata from a data source. In an embodiment, the metadata includes a plurality of column names that are present in a custom database of the data source. In an embodiment, the data source may include one or more custom databases. In an embodiment, the custom database may be generated from one or more databases having the information related to customers under the plurality of column names, including PII and non-PII.

The plurality of column names are extracted from the custom database to form the metadata. In an embodiment, each column name of the plurality of column names is indicative of one of a PII category and a non-PII category. The PII category refers to the PII and the non-PII category refers to the non-PII. In an embodiment, the PII column names may be present with different terminology, variety and combination of the column names in the metadata, when compared with the plurality of PII column names present in the defined PII dataset. Similarly, the non-PII column names may also be present with different terminology, variety and combination of the column names in the metadata. In an embodiment, the metadata including the plurality of column names, may be stored in the repository 102B of the system 100. Also, the data source may be stored in the repository 102B of the system 100.

A sample metadata having 10 column names, including: 'First Name', 'Loan', 'Salary', 'Performance', 'Grade', 'Address', 'Tax paid', 'Date of Birth', 'Book' and 'Bill amount', is considered to explain the subsequent steps of the method 200. Some column names out of the 10 column names such as 'First Name', 'Address' are PII column names indicating the PII category and some column names out of the 10 column names such as 'Book', 'Bill amount' are non-PII column names, indicating the non-PII category.

At step 206 of the method 200, the one or more hardware processors 104 of the system 100 are configured to calculate a highest match distance value for each column name of the plurality of column names present in the metadata received at step 204 of the method 200. In an embodiment, a set of match distance values for each column name is calculated, based on a match distance value between the corresponding column name and each PII column name of the plurality of PII column names present in the defined PII dataset.

In an embodiment, a Levenshtein algorithm is employed to calculate the match distance value between each column name with each PII column name and likewise, the set of match distance values for each column name is calculated. A highest value among the set of match distance values of the column name, is calculated as the highest match distance value for the corresponding column name. The Levenshtein algorithm calculates the match distance value in terms of percentages (%).

The calculated highest match distance value for each column name of the sample metadata mentioned at step 204 of the method 200, using the Levenshtein algorithm, is mentioned in a below table 1:

TABLE 1

| Column names of sample metadata | Highest match distance value (in %) |
|---|---|
| First Name | 100 |
| Loan | 50 |
| Salary | 50 |
| Performance | 61.9 |
| Grade | 66.66 |
| Address | 100 |
| Tax paid | 64.7 |
| Date of Birth | 100 |
| Book | 50 |
| Bill amount | 61.11 |

From table 1, the column name 'First Name' present in the sample metadata is exactly matching with the PII column name 'First Name' present in the defined PII dataset. Hence the highest match distance value for the column name 'First Name' is 100. Similarly, the column name 'Grade' present in the sample metadata is nearly matching with the PII column name 'Gender' present in the defined PII dataset. Hence the highest match distance value for the column name 'Grade' is 66.66, and so on.

At step 208 of the method 200, the one or more hardware processors 104 of the system 100 are configured to determine a string comparator value for each column name of the plurality of column names present in the metadata. In an embodiment, the string comparator value for each column name is determined by comparing corresponding column name with each PII column name of the plurality of PII column names present in the defined PII dataset. In an embodiment, a string comparator function is employed to compare the corresponding column name with each PII column name of the plurality of PII column names.

The string comparator function returns a Boolean value, either '1' or '0'. The string comparator value for the column name is '1', if the corresponding column name is exactly matching with any one of the PII column name of the plurality of PII column names present in the defined PII dataset. Similarly, the string comparator value for the column name is '0', if the corresponding column name is not matching with any one of the PII column name of the plurality of PII column names present in the defined PII dataset. The string comparator value for each column name of the sample metadata mentioned at step 204 of the method 200 is mentioned in below table 2:

TABLE 2

| Column names of sample metadata | String comparator value |
|---|---|
| First Name | 1 |
| Loan | 0 |
| Salary | 0 |
| Performance | 0 |
| Grade | 0 |
| Address | 1 |
| Tax paid | 0 |
| Date of Birth | 1 |
| Book | 0 |
| Bill amount | 0 |

From table 2, the column name 'First Name' present in the sample metadata is exactly matching with the PII column name 'First Name' present in the defined PII dataset. Hence the string comparator value for the column name 'First Name' is 1. Similarly, the column name 'Grade' present in the sample metadata is not matching with any of the PII column names present in the defined PII dataset. Hence the string comparator value for the column name 'Grade' is 0.

At step 210 of the method 200, the one or more hardware processors 104 of the system 100 are configured to evaluate an is PII indicator value for each column name of the plurality of column names present in the metadata. In an embodiment, the is PII indicator value for each column name is evaluated based on: (i) the highest match distance value of the corresponding column name, determined at step 206 of the method 200, and (ii) the string comparator value of the corresponding column name, determined at step 208 of the method 200. The is PII indicator value is a Boolean value, either '1' or '0'. In an embodiment, the is PII indicator value for the column name is '1', if the highest match distance value of the corresponding column name is greater than or equal to a predefined threshold value or the string comparator value of the corresponding column name is '1'. Similarly, the is PII indicator value for the column name is '0', if the highest match distance value of the corresponding column name is less than the predefined threshold value or the string comparator value of the corresponding column name is '0'. Below table 3 show the is PII indicator values for the column names present in the sample metadata, considering the predefined threshold value as '72'.

TABLE 3

| Column names of sample metadata | String comparator value | Highest match distance value | isPII indicator value |
| --- | --- | --- | --- |
| First Name | 1 | 100 | 1 |
| Loan | 0 | 50 | 0 |
| Salary | 0 | 50 | 0 |
| Performance | 0 | 61.9 | 0 |
| Grade | 0 | 66.667 | 0 |
| Address | 1 | 100 | 1 |
| Tax paid | 0 | 64.7 | 0 |
| Date of Birth | 1 | 100 | 1 |
| Book | 0 | 50 | 0 |
| Bill amount | 0 | 61.11 | 0 |

From table 3, the column names of the sample metadata having the is PII indicator value being '1' are most likely to be PII columns. This indicates, the column names out of the plurality of column names present in the metadata, having the is PII indicator value being '1' are most likely to be the PII columns and the information present under the PII columns will likely be the PII.

At step 212 of the method 200, the one or more hardware processors 104 of the system 100 are configured to obtain a sub-metadata including one or more column names selected from the plurality of column names present in the metadata. In an embodiment, the one or more column names of the sub-metadata are selected based on the highest match distance value of the corresponding column name present in the metadata and the is PII indicator value of the corresponding column name present in the metadata.

In an embodiment, the plurality of column names present in the metadata are sorted according to the highest match distance value in descending order. Then, a predefined number of column names that are present first (on top) after the sorting are included in the sub-metadata, based on the corresponding is PII indicator values. The predefined number of column names is intelligently decided by the system 100 such that the sub-metadata may include a predefined percentage of number of column names having is PII indicator value being '1' and a predefined percentage of number of column names having is PII indicator value being '0'.

A sample sub-metadata obtained after sorting the column names present in the sample metadata, is mentioned in the below table 4. The predefined number of column names is considered as 8. The predefined percentage of number of column names having the is PII indicator value being '1' and a predefined percentage of number of column names having the is PII indicator value being '0' are considered as 37.5% and 62.5% respectively.

TABLE 4

| Column names of sample sub-metadata | String comparator value | Highest match distance value | isPII indicator value |
| --- | --- | --- | --- |
| First Name | 1 | 100 | 1 |
| Address | 1 | 100 | 1 |
| Date of Birth | 1 | 100 | 1 |
| Grade | 0 | 66.667 | 0 |
| Tax paid | 0 | 64.7 | 0 |
| Performance | 0 | 61.9 | 0 |
| Bill amount | 0 | 61.11 | 0 |
| Loan | 0 | 50 | 0 |

At step 214 of the method 200, the one or more hardware processors 104 of the system 100 are configured to divide the one or more column names of the sub-metadata into a training dataset and a testing dataset, based on a random sampling method. In an embodiment, a stratified random sampling method is applied on the one or more column names of the sub-metadata to divide the one or more column names into the training dataset and the testing dataset. The stratified random sampling method divides the sub-metadata, based on number of column names of the one or more column names of the sub-metadata having the is PII indicator value being '1' and also based on number of column names of the one or more column names of the sub-metadata having the is PII indicator value being '0'.

A sample training dataset and a sample testing dataset are shown in table 5a and table 5b respectively, by applying the stratified random sampling method on the one or more column names of the sample sub-metadata.

TABLE 5a

| Column names | Highest match distance value | isPII indicator value |
| --- | --- | --- |
| First Name | 100 | 1 |
| Address | 100 | 1 |
| Grade | 66.667 | 0 |
| Tax paid | 64.7 | 0 |
| Performance | 61.9 | 0 |

TABLE 5b

| Column names | Highest match distance value | isPII indicator value |
|---|---|---|
| Date of Birth | 100 | 1 |
| Bill amount | 61.11 | 0 |
| Loan | 50 | 0 |

From table 5a, the number of column names present in the sample training dataset is 5, out of which, the number of column names of the one or more column names of the sub-metadata having the is PII indicator value being '1' is 2 and the number of column names of the one or more column names of the sub-metadata having the is PII indicator value being '0' are 3. From table 5b, the number of column names present in the sample training dataset is 3, out of which, the number of column names of the one or more column names of the sub-metadata having the is PII indicator value being '1' is 1 and the number of column names of the one or more column names of the sub-metadata having the is PII indicator value being '0' are 2.

At step 216 of the method 200, the one or more hardware processors 104 of the system 100 are configured to generate a training sparse matrix based on the training dataset and the sub-metadata, and a testing sparse matrix based on the testing dataset and the sub-metadata. In an embodiment, the training sparse matrix is generated based on the one or more column names present in the training dataset and one or more unique words obtained from the one or more column names present in the sub-metadata.

In an embodiment, a bag of words model is applied on the one or more column names present in the sub-metadata, to obtain the one or more unique words. The bag of words model converts the one or more column names present in the sub-metadata, into unique words (called as 'bag of words'). During the conversion process, prepositions like 'of', articles like 'a', 'an', and 'the', special characters like '_', '.', and so on, present in the one or more column names are removed. The unique words will be in lower case after the conversion process.

The training sparse matrix includes a plurality of training rows and a plurality of training columns. The plurality of training rows are the one or more column names present in the training dataset, whereas the plurality of training columns are the one or more unique words obtained from the one or more column names present in the sub-metadata. Below table 6a shows a sample training sparse matrix generated based on the one or more column names present in the sample training dataset and the one or more unique words obtained from the one or more column names present in the sample sub-metadata.

TABLE 6a

| Column names | first | name | amount | address | grade | bill | date | birth | loan | tax | paid | performance |
|---|---|---|---|---|---|---|---|---|---|---|---|---|
| First Name | | | | | | | | | | | | |
| Address | | | | | | | | | | | | |
| Grade | | | | | | | | | | | | |
| Tax paid | | | | | | | | | | | | |
| Performance | | | | | | | | | | | | |

In an embodiment, the testing sparse matrix is generated based on the one or more column names present in the testing dataset and the one or more unique words obtained from the one or more column names present in the sub-metadata. The testing sparse matrix includes a plurality of testing rows and a plurality of testing columns. The plurality of testing rows are the one or more column names present in the testing dataset, whereas the plurality of testing columns are the one or more unique words obtained from the one or more column names present in the sub-metadata. Below table 6b shows a sample testing sparse matrix generated based on the one or more column names present in the sample testing dataset and the one or more unique words obtained from the one or more column names present in the sample sub-metadata.

TABLE 6b

| Column names | first | name | amount | address | grade | bill | date | birth | loan | tax | paid | performance |
|---|---|---|---|---|---|---|---|---|---|---|---|---|
| Date of Birth | | | | | | | | | | | | |
| Bill amount | | | | | | | | | | | | |
| Loan | | | | | | | | | | | | |

At step 218 of the method 200, the one or more hardware processors 104 of the system 100 are configured to obtain training sparse matrix features and testing sparse matrix features. The training sparse matrix features are indicative of matrix elements present in the training sparse matrix, whereas the testing sparse matrix features are indicative of matrix elements present in the testing sparse matrix.

The training sparse matrix features (matrix elements) are represented in binary numbers (comprising 0's and 1's) and the training sparse matrix features for each column name present in the training sparse matrix are obtained based on whether a word of the one or more unique words is present in the corresponding column name or not. A sample training sparse matrix features for the column names of the sample training sparse matrix are shown in below table 7a:

TABLE 7a

| Column names | first | name | amount | address | grade | bill | date | birth | loan | tax | paid | performance |
|---|---|---|---|---|---|---|---|---|---|---|---|---|
| First Name | 1 | 1 | 0 | 0 | 0 | 0 | 0 | 0 | 0 | 0 | 0 | 0 |
| Address | 0 | 0 | 0 | 1 | 0 | 0 | 0 | 0 | 0 | 0 | 0 | 0 |
| Grade | 0 | 0 | 0 | 0 | 1 | 0 | 0 | 0 | 0 | 0 | 0 | 0 |
| Tax paid | 0 | 0 | 0 | 0 | 0 | 0 | 0 | 0 | 0 | 1 | 1 | 0 |
| Performance | 0 | 0 | 0 | 0 | 0 | 0 | 0 | 0 | 0 | 0 | 0 | 1 |

From table 7a, the unique word 'first' is part of the column name 'First Name', hence it is '1'. Similarly, the unique word 'first' is not a part of the column name 'Address', hence it is '0'. Likewise, the training sparse matrix features are obtained for each column name present in the training sparse matrix.

Similarly, the testing sparse matrix features are also represented in binary numbers (comprising 0's and 1's) and the testing sparse matrix features for each column name present in the testing sparse matrix are obtained based on whether a word of the one or more unique words is present in the corresponding column name or not. A sample testing sparse matrix features for the column names of the sample testing sparse matrix are shown in below table 7b:

TABLE 7b

| Column names | first | name | amount | address | grade | bill | date | birth | loan | tax | paid | performance |
|---|---|---|---|---|---|---|---|---|---|---|---|---|
| Date of Birth | 0 | 0 | 0 | 0 | 0 | 0 | 1 | 1 | 0 | 0 | 0 | 0 |
| Bill amount | 0 | 0 | 1 | 0 | 0 | 1 | 0 | 0 | 0 | 0 | 0 | 0 |
| Loan | 0 | 0 | 0 | 0 | 0 | 0 | 0 | 0 | 1 | 0 | 0 | 0 |

From table 7b, the unique word 'amount' is part of the column name 'Bill amount', hence it is '1'. Similarly, the unique word 'amount' is not a part of the column name 'Date of Birth', hence it is '0'. Likewise, the testing sparse matrix features are obtained for each column name present in the testing sparse matrix.

At step 220 of the method 200, the one or more hardware processors 104 of the system 100 are configured generate a PII classification model, using a machine learning model and an input training dataset. The input training dataset comprises the training sparse matrix features obtained at step 218 of the method 200, associated highest match distance values, and associated is PII indicator values. The associated highest match distance values are the highest match distance values of the column names present in the training sparse matrix, obtained at step 206 of the method 200, and the associated is PII indicator values are the is PII indicator values of the column names present in the training sparse matrix, obtained at step 210 of the method 200.

In an embodiment, the machine learning model may include classification models such as Naïve Bayes classification model but are not limited to other classification models and other machine learning models. The one or more hardware processors 104 of the system 100 are configured train the machine learning model with the input training dataset to generate the PII classification model. For example, the Naïve Bayes classification model is trained with the input training dataset considering the training sparse matrix features and the associated highest match distance values as source variables, and the associated is PII indicator values as target variables. Below table 8a shows a sample input training dataset for the column names of the sample training sparse matrix.

TABLE 8a

| Column names | first | name | amount | address | grade | bill | date | birth | loan | tax | paid | performance | Highest match distance value | isPII indicator value |
|---|---|---|---|---|---|---|---|---|---|---|---|---|---|---|
| First Name | 1 | 1 | 0 | 0 | 0 | 0 | 0 | 0 | 0 | 0 | 0 | 0 | 100 | 1 |
| Address | 0 | 0 | 0 | 1 | 0 | 0 | 0 | 0 | 0 | 0 | 0 | 0 | 100 | 1 |
| Grade | 0 | 0 | 0 | 0 | 1 | 0 | 0 | 0 | 0 | 0 | 0 | 0 | 66.667 | 0 |
| Tax paid | 0 | 0 | 0 | 0 | 0 | 0 | 0 | 0 | 0 | 1 | 1 | 0 | 64.7 | 0 |
| Performance | 0 | 0 | 0 | 0 | 0 | 0 | 0 | 0 | 0 | 0 | 0 | 1 | 61.9 | 0 |

The Naive Bayes classification model works on basis of a Bayes theorem making a simple assumption that each of features are independent of each other. During the training, the Naive Bayes classification model calculate Bayes Theorem based probability scores including a PII score and a non-PII score, for each column name present in the input training dataset, using the training sparse matrix features, the highest match distance value of the corresponding column name and the is PII indicator value of the corresponding column name. Then, the Naive Bayes classification model learns a relation between the PII score and the non-PII score and correlates with the is PII indicator value of the corresponding column name.

It is noticed during the training that if the PII score of the column name is greater than its non-PII score, then such column name is said to be PII column name and the Naive Bayes classification model learn the associated is PII indicator value as '1'. Similarly, if the PII score of the column name is lesser than the non-PII score, then such column name is said to be the non-PII and the Naive Bayes classification model learn the associated is PII indicator value as '0'. Likewise, the Naive Bayes classification model is learned during the training, with the column names present in the training dataset along with the training sparse matrix features, the associated highest match distance values, and the associated is PII indicator values.

For example, the PII score (P(PII|First name)) and the non-PII score (P(non-PII|First name)) for the column name 'First Name' present in the sample testing sparse matrix are calculated as shown below:

$$P(PII|\text{First name}) =$$
$$[P(\text{First}|PII) + L] * [P(\text{name}|PII) + L] * [$$
$$P(\text{matching percent}|PII) + L] * [P(PLL)]$$
$$= [1/2 + 1] * [1/2 + 1] * 2/2 + 1] * [2/5]$$
$$= 1.5 * 1.5 * 2 * 0.4$$
$$= 1.8$$

where P(First|PII) indicates a probability score of the word 'First' (feature with respect to Naive Bayes classification model) based on its presence as PII in the sample testing sparse matrix, P(name|PII) indicates a probability score of the word 'Name' (feature with respect to Naive Bayes classification model) based on its presence as PII in the sample testing sparse matrix, P(matching percent|PII) indicates the probability score with reference to the highest match distance value of the column name 'First Name', P(PII) indicates the probability score of the column name 'First Name' being the PII column (calculated based on the is PII indicator value, and L indicates a Laplace smooth value which is considered as '1' in this embodiment.

$$P(\text{non} - PII|\text{ First name}) =$$
$$[P(\text{First}|\text{non} - PII) + L] * [$$
$$P(\text{name}|\text{non} - PII) + L] * [P(\text{matching percent}|\text{non} - PII) + L] * [$$
$$P(\text{non} - PII)]$$
$$= [0 + 1] * [0 + 1] * [0 + 1] * [3/5]$$
$$= 0.6$$

where P(First|non-PII) indicates a probability score of the word 'First' (feature with respect to Naive Bayes classification model) based on its presence as non-PII in the sample testing sparse matrix, P(name|non-PII) indicates a probability score of the word 'Name' (feature with respect to Naive Bayes classification model) based on its presence as non-PII in the sample testing sparse matrix, P(matching percent|non-PII) indicates the probability score with reference to the highest match distance value of the column name 'First Name', P(PII) indicates the probability score of the column name 'First Name' being the non-PII column (calculated based on the is PII indicator value, and L indicates the Laplace smooth value which is considered as in this embodiment.

In an embodiment, the one or more hardware processors 104 of the system 100 are configured to validate the PII classification model generated at step 220 of the method 200, using an input testing dataset. The input testing dataset including testing sparse matrix features obtained at step 218 of the method 200, the associated highest match distance values obtained at step 206 of the method 200, and the associated is PII indicator values obtained at step 210 of the method 200. The associated highest match distance values are the highest match distance values of the column names present in the testing sparse matrix and the associated is PII indicator values are the is PII indicator values of the column names present in the testing sparse matrix. Below table 8b shows a sample input testing dataset for the column names of the sample testing sparse matrix.

TABLE 8b

| Column names | first | name | amount | address | grade | bill | date | birth | loan | tax | paid | performance | Highest match distance value | isPII indicator value |
|---|---|---|---|---|---|---|---|---|---|---|---|---|---|---|
| Date of Birth | 0 | 0 | 0 | 0 | 0 | 0 | 1 | 1 | 0 | 0 | 0 | 0 | 100 | 1 |
| Bill amount | 0 | 0 | 1 | 0 | 0 | 1 | 0 | 0 | 0 | 0 | 0 | 0 | 61.11 | 0 |
| Loan | 0 | 0 | 0 | 0 | 0 | 0 | 0 | 0 | 1 | 0 | 0 | 0 | 50 | 0 |

During the validation, the PII classification model generated at step 220 of the method is tested and validated in the way explained during training at step 220 of the method 200. The PII classification model is validated to improve the accuracy and is continuously enhanced by optimizing the training dataset obtained at step 214 of the method 200.

In an embodiment, the one or more hardware processors 104 of the system 100 are configured to receive an input customer database including one or more input column names that are to be detected as PII column or non-PII column. In an embodiment, the input customer database may be received from the organization or organizations who maintains the customer related information. In an embodiment, the input customer database may be stored in the repository 1026 of the system 100.

A sample input customer database including two input column names being 'Middle Name' and 'Loan paid', is considered to detect whether the two input column names 'Middle Name' and 'Loan paid' are the PII column or the non-PII column.

The highest match distance value for each input column name of the one or more input column names present in the input customer database, is calculated. In an embodiment, a set of match distance values for each input column name is calculated, based on a match distance value between the corresponding input column name and each PII column name of the plurality of PII column names present in the defined PII dataset.

In an embodiment, the Levenshtein algorithm is employed to calculate the match distance value between each input column name with each PII column name and likewise, the set of match distance values for each input column name is calculated. A highest value among the set of match distance values of the input column name, is determined as the highest match distance value for the corresponding input column name. The Levenshtein algorithm calculates the match distance value in terms of percentages (%).

An input sparse matrix is generated based on the input customer database and the sub-metadata. In an embodiment, the input sparse matrix is generated based on the one or more input column names present in the input customer database, and the one or more unique words obtained from the one or more column names present in the sub-metadata, at step 216 of the method 200. The input sparse matrix includes a plurality of input rows and a plurality of input columns. The plurality of input rows are the one or more column names present in the input customer database, whereas the plurality of input columns are the one or more unique words obtained from the one or more column names present in the sub-metadata.

Input sparse matrix features that are indicative of matrix elements present in the input sparse matrix are obtained by the one or more hardware processors 104 of the system 100. As explained at step 218 of the method 200, the input sparse matrix features are represented in binary numbers (comprising 0's and 1's) and the input sparse matrix features for each input column name present in the input sparse matrix are obtained based on whether a word of the one or more unique words obtained from the one or more column names present in the sub-metadata, at step 216 of the method 200, is present in the corresponding input column name or not. A sample input sparse matrix features for the column names of the input sparse matrix, generated based on the two column names present in the sample input customer database, is shown in below table 9:

TABLE 9

| Input column names | first | name | amount | address | grade | bill | date | birth | loan | tax | paid | performance |
|---|---|---|---|---|---|---|---|---|---|---|---|---|
| Middle name | 0 | 1 | 0 | 0 | 0 | 0 | 0 | 0 | 0 | 0 | 0 | 0 |
| Loan paid | 0 | 0 | 0 | 0 | 0 | 0 | 0 | 0 | 1 | 0 | 1 | 0 |

From table 9, the unique word 'name' is part of the input column name 'Middle name', hence it is '1'. Similarly, the unique word 'paid' is part of the input column name 'Loan paid', hence it is '1'. Likewise, the input sparse matrix features are obtained for each input column name present in the input sparse matrix.

The one or more hardware processors 104 of the system 100 are configured to detect each input column name of the one or more input column names as the PII column or the non-PII column, using the PII classification model generated at step 220 of the method 200. The PII classification model detects the input column name as the PII column or the non-PII column, based on the input sparse matrix features and the associated highest match distance value.

The PII classification model calculates the PII score and the non-PII score for each input column name to be detected as the PII column or the non-PII column using the input sparse matrix features and the highest match distance value of the corresponding input column name. Then the calculated PII score and the non-PII score of the corresponding input column name are compared. The PII classification model detects the corresponding input column name as the PII column, if the PII score is greater than the non-PII score. Similarly, the PII classification model detects the corresponding input column name as the non-PII column, if the PII score is less than the non-PII score.

Below table 10 shows a sample detecting dataset including the input sparse matrix features and the associated highest match distance values being input to the PII classification model.

TABLE 10

| Input column names | first | name | amount | address | grade | bill | date | birth | loan | tax | paid | performance | Highest match distance value |
|---|---|---|---|---|---|---|---|---|---|---|---|---|---|
| Middle name | 0 | 1 | 0 | 0 | 0 | 0 | 0 | 0 | 0 | 0 | 0 | 0 | 100 |
| Loan paid | 0 | 0 | 0 | 0 | 0 | 0 | 0 | 0 | 1 | 0 | 1 | 0 | 66.67 |

The PII score and the non-PII score calculation for input column names 'Middle name' and 'Loan paid' are shown below:

$$P(PII|\text{Middle name}) = [P(\text{Middle}|PII) + L] * [$$
$$P(\text{name}|PII) + L] * [P(\text{matching percent}|PII) + L] * [P(PII])$$

-continued $$= [0+1]*[1/2+1]*[2/2+1]*[2/5]$$

$$= 1*1.5*2*0.4$$

$$= 1.2$$

$$P(\text{non} - PII|\text{Middle name}) = [P(\text{Middle}|\text{non} - PII) + L]*[$$

$$P(\text{name}|\text{non} - PII) + L]*[$$

$$P(\text{matching percent}|\text{non} - PII) + L]*[P(\text{non} - PII)]$$

$$= [0+1]*[0+1]*[0+1]*[3/5]$$

$$= 0.6$$

$$P(\text{non} - PII|\text{Loan paid}) = [P(\text{Loan}|PII) + L]*[$$

$$P(\text{paid}|PII) + L]*[$$

$$P(\text{matching percent}|PII) + L]*[P(PII)]$$

$$= [0+1]*[0+1]*[0+1]*[2/5]$$

$$= 0.4$$

$$P(\text{non} - PII|\text{Loan paid}) = [P(\text{Loan}|\text{non} - PII) + L]*[$$

$$P(\text{paid}|\text{non} - PII) + L]*[P(\text{matching percent}|$$

$$\text{non} - PII) + L]*[P(\text{non} - PII)]$$

$$= [0+1]*[1/3+1]*[1/3+1]*[3/5]$$

$$= 1*1.33*1.33*0.6$$

$$= 1.06$$

From the above calculation, the PII score of the input column names 'Middle name' (1.2) is greater than the non-PII score (0.6), hence the PII classification model detects the input column names 'Middle name' as the PII column. Similarly, the PII score of the input column names 'Loan paid' (0.4) is less than the non-PII score (1.06), hence the PII classification model detects the input column names 'Loan paid' as the non-PII column. The information present under the input column names detected as PII column are protected in several ways including masking hiding, encryption and so on for the safety of PII.

In accordance with an embodiment of the present disclosure, the metadata received at step 204 of the method 200 includes a huge number of column names comprising the words related to PII columns or PII column names. The huge number of column names are processed by the way of the highest match distance values, the string comparator values, and the is PII indicator values to get the enhanced sub-metadata comprising the column names that can be easily differentiated as PII columns or non-PII columns. Hence the training dataset and the testing dataset generated at step 214 of the method 200, as well as the input training dataset and input testing dataset improves the accuracy of the PII classification model for detecting the PII columns and non-PII columns. Also, the input training dataset and input testing dataset makes the PII classification model robust by employing the validation and testing, and continuous training. The training dataset and the testing dataset may be utilized a knowledge base for continuous improvement of the PII classification model and to improve the accuracy of the PII classification model.

The PII classification model generated at step 220 of the method 200 may effectively detect the column names with different terminology, variety and combination of relevant words, as PII columns and non-PII columns. Hence the organizations may take preventive measures effectively to protect such PII present under the PII columns by employing various data privacy and protection techniques including masking, encryption and so on.

Example Scenario

In an example scenario, the PII classification model present at step 220 of the method 200 is generated using the Naive Bayes classification model, from the sub-metadata comprising a sample size of 1842 column names, where 90% samples are used for training and remaining 10% samples are used for testing. The sub-metadata comprising the sample size of 1842 column names, is obtained from the metadata comprising a sample size of 24000 column names. During the testing, the PII classification model is validated with 10% samples and achieved the detection accuracy of 89.24%.

The input customer database having 920 tables with 8173 unique input column names is experimented with the PII classification model to detect the PII columns and the non-PII columns. The system 100 with dual core E8400 processors, clock speed of 3 GHz, 8 GB RAM and Windows 10™ 64-bit operating system is used during the experiment. Out of 8173 unique input column names, 149 are actual PII columns. The present disclosure correctly detected 121 unique input column names as the PII columns out of 149 actual PII columns. Hence the accuracy of the PII classification model for the input customer database having 920 tables with 8173 unique input column names. stands at 91.61%.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims (when included in the specification), the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method, comprising the steps of:
   receiving, via one or more hardware processors, a defined personally identifiable information (PII) dataset, wherein the defined PII dataset comprises a plurality of PII column names;
   receiving, via the one or more hardware processors, a metadata comprising a plurality of column names from a data source, wherein each column name of the plurality of column names is indicative of one of a PII category and a non-PII category;
   calculating, via the one or more hardware processors, a highest match distance value for each column name of the plurality of column names present in the metadata, based on the plurality of PII column names present in the defined PII dataset, wherein the highest match distance value is in terms of percentage ('%');
   determining, via the one or more hardware processors, a string comparator value for each column name of the plurality of column names present in the metadata, based on the plurality of PII column names present in the defined PII dataset;
   evaluating, via the one or more hardware processors, an isPII indicator value for each column name of the plurality of column names present in the metadata, based on the highest match distance value and the string comparator value;
   obtaining, via the one or more hardware processors, a sub-metadata comprising one or more column names selected from the plurality of column names present in the metadata, based on the highest match distance value and the isPII indicator value;
   dividing, via the one or more hardware processors, the one or more column names of the sub-metadata into a training dataset and a testing dataset, based on a random sampling method;
   generating, via the one or more hardware processors, a training sparse matrix based on the training dataset and the sub-metadata, and a testing sparse matrix based on the testing dataset and the sub-metadata;
   obtaining, via the one or more hardware processors, training sparse matrix features and testing sparse matrix features, wherein the training sparse matrix features are indicative of matrix elements present in the training sparse matrix and the testing sparse matrix features are indicative of matrix elements present in the testing sparse matrix; and
   generating, via the one or more hardware processors, a PII classification model, by training a machine learning model with an input training dataset, wherein the input training dataset comprises the training sparse matrix features, associated highest match distance values, and associated isPII indicator values, wherein the PII classification model calculates a PII score and a non-PII score for each column name to be detected as the PII column or the non-PII column using the input sparse matrix features and the highest match distance value of the corresponding column name, wherein the machine learning model learns a relation between the PII score and the non-PII score and correlates with the isPII indicator value of the corresponding column name,
   wherein the PII score is computed with a probability score of the column name based on presence as PII in an input sparse matrix, a probability of matching percentage indicating the probability score with reference to the highest match distance value of the column name, a probability score of the column name being the PII column that is calculated based on the isPII indicator value, and a Laplace smooth value which is considered as '1',
   wherein the non-PII score is computed with a probability score of the column name based on presence as non-PII in the input sparse matrix, a probability of the matching percentage indicating the probability score with reference to the highest match distance value of the column name, a probability score of the column name being the non-PII column that is calculated based on the isPII indicator value, and a Laplace smooth value which is considered as '1',
   wherein during training of the machine learning model, when the PII score of the column name is greater than the non-PII score, the column name is said to be PII column name and the machine learning model learns the associated is isPII indicator value as '1' and when the PII score of the column name is lesser than the non-PII score, the column name is said to be the non-PII and the machine learning model learns the associated isPII indicator value as '0'.

2. The method as claimed in claim 1, further comprising, validating the PII classification model, using an input testing dataset comprising testing sparse matrix features, the associated highest match distance values, and the associated isPII indicator values.

3. The method as claimed in claim 1, further comprising:
receiving, via the one or more hardware processors, an input customer database comprising one or more input column names to be detected as PII column or non-PII column; calculating, via the one or more hardware processors, the highest match distance value for each input column name of the one or more input column names present in the input customer database;
generating, via the one or more hardware processors, an input sparse matrix based on the input customer database and the sub-metadata;
obtaining, via the one or more hardware processors, input sparse matrix features that are indicative of matrix elements present in the input sparse matrix; and
detecting, via the one or more hardware processors, each input column name of the one or more input column names as the PII column or the non-PI column, using the PII classification model, based on the input sparse matrix features and the associated highest match distance value, wherein the PII classification model detects the input column name as the PII column, when the PII score is greater than the non-PII score, wherein the PII classification model detects the corresponding input column name as the non-PII column, when the PII score is less than the non-PII score.

4. The method as claimed in claim 1, wherein determining the highest match distance value for each column name of the plurality of column names present in the metadata, comprises:
calculating a set of match distance values for each column name, based on a match distance value between a corresponding column name and each PII column name of the plurality of PII column names present in the defined PII dataset; and
determining a highest value among the set of match distance values, as the highest match distance value for the corresponding column name.

5. The method as claimed in claim 1, wherein the string comparator value for each column name is determined by comparing corresponding column name with each PII column name of the plurality of PII column names present in the defined PII dataset.

6. The method as claimed in claim 1, wherein the training sparse matrix is generated based on the one or more column names present in the training dataset and one or more unique words obtained from the one or more column names present in the sub-metadata.

7. The method as claimed in claim 1, wherein the testing sparse matrix is generated based on the one or more column names present in the testing dataset and the one or more unique words obtained from the one or more column names present in the sub-metadata.

8. The method as claimed in claim 3, wherein determining the highest match distance value for each input column name of the one or more input column names present in the input customer database, comprises:

calculating a set of match distance values for each input column name, based on the match distance value between a corresponding input column name and each PII column name of the plurality of PII column names present in the defined PII dataset; and
determining a highest value among the set of match distance values, as the highest match distance value for the corresponding input column name.

9. The method as claimed in claim 3, wherein the input sparse matrix is generated based on the one or more input column names present in the input customer database, and the one or more unique words obtained from the one or more column names present in the sub-metadata.

10. A system comprising:
one or more data storage devices operatively coupled to one or more hardware processors and configured to store instructions which when executed cause the one or more hardware processors to:
receive a defined personally identifiable information (PII) dataset, wherein the defined PII dataset comprises a plurality of PII column names;
receive a metadata comprising a plurality of column names from a data source, wherein each column name of the plurality of column names is indicative of one of a PII category and a non-PII category;
calculate a highest match distance value for each column name of the plurality of column names present in the metadata, based on the plurality of PII column names present in the defined PII dataset, wherein the highest match distance value is in terms of percentage ('%');
determine a string comparator value for each column name of the plurality of column names present in the metadata, based on the plurality of PII column names present in the defined PII dataset;
evaluate an isPII indicator value for each column name of the plurality of column names present in the metadata, based on the highest match distance value and the string comparator value;
obtain a sub-metadata comprising one or more column names selected from the plurality of column names present in the metadata, based on the highest match distance value and the isPII indicator value;
divide the one or more column names of the sub-metadata into a training dataset and a testing dataset, based on a random sampling method;
generate a training sparse matrix based on the training dataset and the sub-metadata, and a testing sparse matrix based on the testing dataset and the sub-metadata;
obtain training sparse matrix features and testing sparse matrix features, wherein the training sparse matrix features are indicative of matrix elements present in the training sparse matrix and the testing sparse matrix features are indicative of matrix elements present in the testing sparse matrix; and
generate a PII classification model, by training a machine learning model with an input training dataset, wherein the input training dataset comprises the training sparse matrix features, associated highest match distance values, and associated isPII indicator values, wherein the PII classification model calculates a PII score and a non-PII score for each column name to be detected as the PII column or the non-PII column using the input sparse matrix features and the highest match distance value of the corresponding column name, wherein the machine learning model learns a relation between the PII score and the non-PII score and correlates with the isPII indicator value of the corresponding column name, wherein the PII score is computed with a probability score of the column name based on presence as PII in an input sparse matrix, a probability of matching percentage indicating the probability score with reference to the highest match distance value of the column name, a probability score of the column name being the PII column that is calculated based on the isPII indicator value, and a Laplace smooth value which is considered as '1', wherein the non-PII score is computed with a probability score of the column name based on presence as non-PII in the input sparse matrix, a probability of the matching percentage indicating the probability score with reference to the highest match distance value of the column name, a probability score of the column name being the non-PII column that is calculated based on the isPII indicator value, and a Laplace smooth value which is considered as '1', wherein during training of the machine learning model, when the PII score of the column name is greater than the non-PII score, the column name is said to be PII column name and the machine learning model learns the associated isPII indicator value as '1' and when the PII score of the column name is lesser than the non-PII score, then the column name is said to be the non-PII and the machine learning model learns the associated isPII indicator value as '0'.

11. The system as claimed in claim 10, wherein the one or more hardware processors are further configured by the instructions to validate the PII classification model, using an input testing dataset comprising testing sparse matrix features, the associated highest match distance values, and the associated isPII indicator values.

12. The system as claimed in claim 10, wherein the one or more hardware processors are further configured by the instructions to:
receive an input customer database comprising one or more input column names to be detected as PII column or non-PII column;
calculate the highest match distance value for each input column name of the one or more input column names present in the input customer database;
generate an input sparse matrix based on the input customer database and the sub-metadata;
obtain input sparse matrix features that are indicative of matrix elements present in the input sparse matrix; and
detect each input column name of the one or more input column names as the PII column or the non-PII column, using the PII classification model, based on the input sparse matrix features and the associated highest match distance value, wherein the PII classification model detects the input column name as the PII column, when the PII score is greater than the non-PII score, wherein the PII classification model detects the corresponding input column name as the non-PII column, when the PII score is less than the non-PII score.

13. The system as claimed in claim 10, wherein the one or more hardware processors are further configured by the instructions to determine the highest match distance value for each column name of the plurality of column names present in the metadata, by:
calculating a set of match distance values for each column name, based on a match distance value between a corresponding column name and each PII column name of the plurality of PII column names present in the defined PII dataset; and
determining a highest value among the set of match distance values, as the highest match distance value for the corresponding column name.

14. The system as claimed in claim 10, wherein the one or more hardware processors are further configured by the instructions to determine the string comparator value for each column name, by comparing corresponding column name with each PII column name of the plurality of PII column names present in the defined PII dataset.

15. The system as claimed in claim 10, wherein the one or more hardware processors are further configured by the instructions to generate the training sparse matrix, based on the one or more column names present in the training dataset and one or more unique words obtained from the one or more column names present in the sub-metadata.

16. The system as claimed in claim 10, wherein the one or more hardware processors are further configured by the instructions to generate the testing sparse matrix, based on the one or more column names present in the testing dataset and the one or more unique words obtained from the one or more column names present in the sub-metadata.

17. The system as claimed in claim 12, wherein the one or more hardware processors are further configured by the instructions to determine the highest match distance value for each input column name of the one or more input column names present in the input customer database, by:
calculating a set of match distance values for each input column name, based on the match distance value between a corresponding input column name and each PII column name of the plurality of PII column names present in the defined PII dataset; and
determining a highest value among the set of match distance values, as the highest match distance value for the corresponding input column name.

18. The system as claimed in claim 12, wherein the one or more hardware processors are further configured by the instructions to generate the input sparse matrix, based on the one or more input column names present in the input customer database, and the one or more unique words obtained from the one or more column names present in the sub-metadata.

19. A computer program product comprising a non-transitory computer readable medium having a computer readable program embodied therein, wherein the computer readable program, when executed on a computing device, causes the computing device to:
receive a defined personally identifiable information (PII) dataset, wherein the defined PII dataset comprises a plurality of PII column names;
receive a metadata comprising a plurality of column names from a data source, wherein each column name of the plurality of column names is indicative of one of a PII category and a non-PII category;
calculate a highest match distance value for each column name of the plurality of column names present in the metadata, based on the plurality of PII column names present in the defined PII dataset, wherein the highest match distance value is in terms of percentage ('%');
determine a string comparator value for each column name of the plurality of column names present in the metadata, based on the plurality of PII column names present in the defined PII dataset;

evaluate an isPII indicator value for each column name of the plurality of column names present in the metadata, based on the highest match distance value and the string comparator value;

obtain a sub-metadata comprising one or more column names selected from the plurality of column names present in the metadata, based on the highest match distance value and the isPII indicator value;

divide the one or more column names of the sub-metadata into a training dataset and a testing dataset, based on a random sampling method;

generate a training sparse matrix based on the training dataset and the sub-metadata, and a testing sparse matrix based on the testing dataset and the sub-metadata;

obtain training sparse matrix features and testing sparse matrix features, wherein the training sparse matrix features are indicative of matrix elements present in the training Sparse matrix and the testing sparse matrix features are indicative of matrix elements present in the testing sparse matrix; and generate a PII classification model, by training a machine learning model with an input training dataset, wherein the input training dataset comprises the training sparse matrix features, associated highest match distance values, and associated isPII indicator values, wherein the PII classification model calculates a PII score and a non-PII score for each column name to be detected as the PII column or the non-PII column using the input sparse matrix features and the highest match distance value of the corresponding column name, wherein the machine learning model learns a relation between the PII score and the non-PII score and correlates with the isPII indicator value of the corresponding column name, wherein the PII score is computed with a probability score of the column name based on presence as PII in an input sparse matrix, a probability of matching percentage indicating the probability score with reference to the highest match distance value of the column name, a probability score of the column name being the PII column that is calculated based on the isPII indicator value, and a Laplace smooth value which is considered as '1', wherein the non-PII score is computed with a probability score of the column name based on presence as non-PII in the input sparse matrix, a probability of the matching percentage indicating the probability score with reference to the highest match distance value of the column name, a probability score of the column name being the non-PII column that is calculated based on the isPII indicator value, and a Laplace smooth value which is considered as '1', wherein during training of the machine learning model, when the PII score of the column name is greater than the non-PII score, the column name is said to be PII column name and the machine learning model learns the associated isPII indicator value as '1' and when the PII score of the column name is lesser than the non-PII score, the column name is said to be the non-PII and the machine learning model learns the associated isPII indicator value as '0'.

* * * * *